US006620494B2

(12) United States Patent
Will et al.

(10) Patent No.: US 6,620,494 B2
(45) Date of Patent: Sep. 16, 2003

(54) CONDUCTIVE ROLLER

(75) Inventors: Thomas Will, Nuth (NL); Bernardus J. Van Engelshoven, Nuth (NL); Thomas L. Bots, Eindhoven (NL); Joris Gilberts, Eindhoven (NL)

(73) Assignee: Ten Cate Enbi B.V., Nuth (NL)

( * ) Notice: Subject to any disclaimer, the term of this patent is extended or adjusted under 35 U.S.C. 154(b) by 0 days.

(21) Appl. No.: 10/026,945

(22) Filed: Dec. 27, 2001

(65) Prior Publication Data

US 2002/0127381 A1 Sep. 12, 2002

Related U.S. Application Data

(63) Continuation of application No. PCT/NL00/00457, filed on Jun. 29, 2000.

(60) Provisional application No. 60/146,366, filed on Aug. 2, 1999.

(30) Foreign Application Priority Data

Jul. 3, 1999 (NL) ............................................ 1012507

(51) Int. Cl.[7] .......................... B32B 7/02; B32B 27/00; G03G 15/02

(52) U.S. Cl. .................. 428/220; 428/327; 428/423.11; 428/424.2; 428/500; 428/515; 399/174; 399/176

(58) Field of Search ................................ 399/174, 350, 399/357, 176; 428/220, 323, 327, 332, 339, 411.1, 423.1, 424.2, 500, 515, 923, 926, 929

(56) References Cited

U.S. PATENT DOCUMENTS

| | | | | | |
|---|---|---|---|---|---|
| 5,008,706 A | * | 4/1991 | Ohmori et al. | ............. | 355/219 |
| 5,572,294 A | | 11/1996 | Osawa et al. | ............... | 399/174 |
| 6,078,773 A | * | 6/2000 | Shimojo et al. | ............ | 399/302 |

FOREIGN PATENT DOCUMENTS

| | | |
|---|---|---|
| EP | 0594366 | 4/1994 |
| JP | 09062024 | 3/1997 |
| JP | 09305024 | 11/1997 |

* cited by examiner

*Primary Examiner*—Paul Thibodeau
*Assistant Examiner*—Sheeba Ahmed
(74) *Attorney, Agent, or Firm*—Pillsbury Winthrop LLP

(57) ABSTRACT

Conductive article, for example a roller, a doctor blade or a flat or curved plate, at least comprising a conductive sleeve and a covering layer, the covering layer containing a conductive polymer and a film-forming polymer, and method for fabricating such an article, at least comprising the application of a covering layer to a conductive sleeve, wherein the covering layer is formed by the application, to the sleeve, of a mixture of a conductive polymer and a film-forming polymer.

17 Claims, 2 Drawing Sheets

CONDUCTIVE ROLLER

Figure 1:
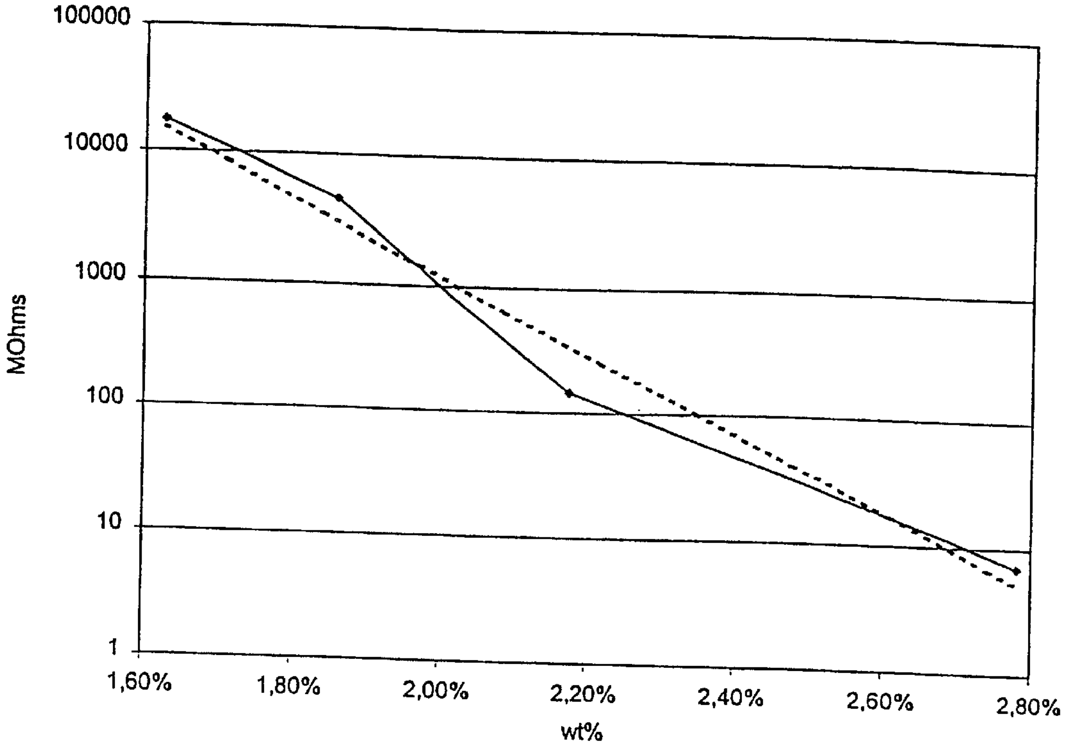

This is a Continuation of International Application No. PCT/NL00/00457 filed Jun. 29, 2000 which designated the U.S. and was published in the English language and claims the benefit of provisional application No. 60/146,366, filed Aug. 2, 1999. The contents of this PCT application are incorporated in their entirety by reference.

The invention relates to a conductive article in which, around a conductive sleeve, a covering layer formed with a composition containing an intrinsic conductive polymer and a film-forming polymer is present, and to a method for fabricating such an article, comprising the application of a layer of said composition to a conductive sleeve.

Conductive articles of this type, in particular rollers, doctor blades and flat or curved plates, are generally used in electrophotographic and xerographic printing and copying equipment, faxes and other office equipment, for example as a charge transfer roller for the purpose of electrostatically charging a photosensitive-sensitive drum, as a developing roller for developing an electrostatic latent image on the surface of said drum to produce a visible toner image, as an image transfer roller for transferring the toner image to a copy, or as a doctor blade for controlling the thickness of a toner layer. In the case of hollow rollers, the inside can likewise be coated with a conductive covering layer. During operation, the rollers, blades or plates can either be in continuous contact with a cooperating element, for example a photosensitive drum, or there may be a small gap between the article and the cooperating element.

If, for example in the case of a roller, the latter is in continuous contact with, for example, a drum, then the roller generally consists of a conductive core, often a metal rod, around which a likewise conductive resilient sleeve is fitted. Said sleeve consists of a resilient material which is indented when the roller is pressed against a cooperating roller or face to which charge is to be applied or from which it is to be removed. To supply the charge that is to be transferred, a voltage is applied to the roller. In order, on the one hand, to limit the current through the roller and the cooperating elements with which the roller is brought into contact, but on the other hand to transfer the desired amount of electrical charge sufficiently rapidly, the electrical resistance of the roller needs to be within certain limits. To this end, a covering layer is usually applied to the sleeve, which imparts a desired resistance to the roller as a whole. The electrical resistance of core and sleeve, which is connected in series with the resistance of the covering layer, is preferably selected to be sufficiently small for the covering layer in fact to define the total resistance. The resistance of the roller is measured as the resistance between the location where the roller, during operation, is brought into contact with the voltage to be applied, as a rule the roller shaft, and a point of the outer circumference of the roller.

If the roller, during operation, does not come into contact with a cooperating roller or face, the sleeve may also consist of a non-resilient material, and the sleeves can, for example, also be composed of metal. This is the rule, for example, in the case of magnetic developing rollers. In that case too a covering layer is present which defines the ultimate electrical resistance of the roller.

What has been said hereinabove about rollers also applies to doctor blades and plates insofar as the mutual relationship of the various layers is concerned. At all times, at least one layer, the sleeve, having a high conductivity is present with a covering layer applied thereto which defines the ultimate electrical conductivity. Any differences reside in their shape and design. These, however, do not form part of the present invention and are known per se in the art in question. Where a roller is referred to hereinafter, the disclosure, always allowing for any differences in design, equally applies to doctor blades and flat or curved plates.

The said covering layers are formed, as a rule, from a composition comprising a nonconductive binder and a conductive material finely dispersed therein.

U.S. Pat. No. 5,597,652 discloses a composition for a covering layer of a conductive roller, which consists of nylon, urethane or rubber as a binder and metal oxides or carbon black as a conductive material. The resistance of a covering layer formed from that composition depends on the ratio of binder to conductive material.

A drawback of this known composition is the poor adjustability of the electrical resistance of a covering layer made using the composition. In fact, the resistance of the known composition is found to adopt, depending on the concentration of the conductive material, two values with in between, starting from a certain concentration which is referred to as the percolation threshold, a steep transition section. The one extreme is defined by the resistance of the binder which, as a rule, is very high. The other extreme is defined by the resistance of the conductive material which, from a certain concentration in the binder onwards, forms conductive paths therein. The difference between the two extremes, determined from the resistivity, to be defined hereinafter in more detail, of the material can be very large and often amounts to a factor of from $10^8$ to $10^{11}$. Now those values of the resistance of the covering layer of conductive articles, for example rollers in electrophotographic equipment, for example of a charge transfer roller, which are suitable for practical use are situated precisely between these two extremes and thus in the steep transition section. This makes it particularly difficult for a covering layer having a suitable, desired electrical resistance to be fabricated reproducibly from the known composition.

The resistance of a covering layer could also be affected by its thickness. The thickness of a covering layer, however, is likewise restricted to certain narrow limits. On the one hand, shorting via pinholes or flashovers must be prevented, which imposes a lower limit on the thickness. On the other hand, certainly in the case of rollers which must be indentable, the covering layer must be sufficiently flexible to be able to follow the indentation of the resilient sleeve without becoming detached or rupturing, which imposes an upper limit on the thickness. Variations in thickness will therefore, in most cases, provide no option or only limited options to influence the resistance of the covering layer.

It is an object of the invention to provide a composition from which a covering layer on a conductive roller can be fabricated with an electrical resistance in the range suitable and desired for the covering layers described.

This object is achieved according to the invention by the composition consisting of an intrinsically conductive polymer and an electrically inert film-forming polymer.

It was found that the resistance of this composition, compared with that of the known composition, changes much more evenly as the concentration of the conductive material changes, in this case the intrinsically conductive polymer. In particular, the composition according to the invention does not exhibit the steep transition section between high and low electrical resistance. Using the composition according to the invention it is possible, in a simple and reproducible manner, to apply covering layers to rollers, whose electrical resistance has a desired value at a layer thickness, which is between the limits acceptable in practice.

From U.S. Pat. No. 5,572,294 a roller is known in which the coating layer consists of conductive particles in a binder resin and having a 10% elongation load of not more than 700 gf on a 1 cm wide section. Among the conductive particles also intrinsic conductive polymers are mentioned. Any teaching that the specific combination according to the invention of specific intrinsic conductive polymers with specific film forming resins, in contrast to the other possible combinations, results in coating layers having a controllable electric resistivity showing no steep percolation threshold is absent in this reference EP-A-594,366 discloses a coating layer mandatorily containing, in addition to an (optional) polymer binder and charge injection enabling particles (e.g. conductive polymers), charge transport molecules of a specific type. The last component is not present in the composition of the present invention in which the conductive properties are only due to the presence of the intrinsic conductive polymer.

In the composition, the film-forming polymer acts as a binder within which the intrinsically conductive polymer is dispersed to provide the conductive characteristics. The film-forming polymer is electrically inert, which means that it essentialy does not contribute to the transport of electric charge through the coating layer.

Apart from common additives to the film-forming polymer, for example flow improvers, thickeners and surface tension-reducing agents, no further components, in particular no charge transporting components, are present in the coating layer.

Suitable intrinsically conductive polymers for use in the composition according to the invention include, for example, polyacetylene, polyphenylene, poly(para-phenylene-vinylene), polypyrrole, polyfuran, polythiophene, polyaniline and conductive substituted forms of these polymers and mixtures of two or more of the said compounds. Highly suitable are polypyrrole, polythiophene and conductive substituted forms of these polymers and mixtures of two or more of the said compounds. The intrinsically conductive polymer can be present as such in the composition according to the invention, but may also be bound to a suitable substrate. Highly suitable compositions are those in which the conductive polymer, per se or on a substrate, and the organic polymer are present in disperse form in a dispersant. For the purpose of the invention, a dispersion is any mixture of a dispersant with a conductive and/or film-forming polymer dispersed therein in sufficiently fine form for the intended application, for example a dispersion, a suspension or even a solution.

Suitable as a film-forming polymer for use as a binder in the composition are organic polymers which are able to form a film. Examples of these include poly(vinylidene chloride), polymethacrylates, polyurethanes, poly(vinyl acetate) and poly(vinyl alcohol). Preferred are polymers which, for example as a latex, can be converted into a dispersion in a dispersant, preferably water, and which, during and/or after removal of the dispersant, are able to form a film. Highly suitable are polyurethane resins, which have a high degree of wear resistance and are often highly flexible. For the purpose of the invention, a film is a continuous layer which is essentially impermeable for constituents from the underlying sleeve.

Highly suitable for use in the composition according to the invention are those film-forming polymers which form a film of sufficient flexibility, for example having a reversible elastic elongation of at least 50%. Film-forming polymers should also be understood as including precursors thereof, for example monomers, oligomers or prepolymers which are able to polymerize to form a film or, for example, two-component systems whose components are able to react, for example cross-link, to form a polymeric film. The film-forming polymer is used, as a rule, in the form of a solution or dispersion, on environmental grounds preferably in the form of an aqueous solution or dispersion. A conductive polymer should likewise be dispersible in this dispersion. Those skilled in the art are readily able, by empirical means, to select the practicable combinations of available dispersants for a specific film-forming polymer and a specific conductive polymer. Water-borne dispersions, in particular, of most of the organic polymers mentioned, as well as of intrinsically conductive polymers, are widely known and available.

The invention also relates to a method for fabricating a conductive article, in particular a roller, a doctor blade or a flat or curved plate, which comprises at least a conductive sleeve and a covering layer, wherein the covering layer is formed by the application, to the sleeve, of a mixture of a conductive polymer and a film-forming polymer.

The application of a covering layer to the conductive sleeve in order to fabricate a conductive roller, doctor blade or plate can be effected by methods known per se. This involves, firstly, the preparation of a composition according to the invention, preferably a dispersion of a film-forming polymer and the intrinsically conductive polymer in a suitable dispersant. A highly suitable approach is to blend the intrinsically conductive polymer with a dispersion of the film-forming polymer. The dispersed mixture can then be applied to the sleeve of the article by means of techniques known per se for this purpose. Examples of such techniques include dip-coating, flow-coating, air spraying or airless spraying, onto an electrostatically charged surface if required, and roller application or brush application. To a certain extent, the choice of a specific technique is determined by economic factors, but also, to a considerable extent, by the requirement that the covering layer be applicable in the desired thickness and with the smallest possible scatter in thickness. In the case of manual operation it is feasible to apply a plurality of thin layers, for example by dip-coating in a relatively low-viscosity composition or by electrostatic spraying. In the case of industrial production, dip-coating in a relatively more viscous composition is a suitable technique. After application of the composition, the layer applied is treated in such a way that it changes into a film. This may involve, for example, the mere removal of the solvent, but also curing at elevated temperature in the presence of a cross-linker. The standard techniques for this purpose suitable and feasible for the abovementioned film-forming polymers are known to those skilled in the art.

Adhesion of the film formed to the sleeve can be promoted by the addition of primers known per se for this purpose. Alternatively, the covering layer can be applied, in the case of the sleeve consisting of rubber, to a sleeve whose material has not yet been completely vulcanized. After application of the covering layer, complete vulcanization of the sleeve material is then effected. It was found that this has a beneficial effect on the adhesion of the covering layer to the sleeve. Alternatively, the sleeve surface can be subjected to a corona treatment in order to improve adhesion. At the same time it is possible, to obtain the desired processing characteristics, for the composition to be admixed, for example, with flow improvers, thickeners and surface tension-reducing agents. The uniformity of the film formed may also be affected by the surface roughness of the sleeve. Said surface roughness is preferably below 15 $\mu$m. Greater roughnesses give rise to unevenesses in the covering layer, which adversely affect the quality of, for example, copies made with the aid of an article provided with the covering layer, in particular with the aid of a roller. Preferably, the surface roughness is at most 10 μm and at least 3 μm. Covering layers of lesser roughness are so smooth that the cohesion in the dispersion applied to a sleeve may become greater than the adhesion between dispersion and sleeve material. This may give rise to contraction of the dispersion applied and consequently to non-uniform thickness of the covering layer.

The invention further relates to a conductive article, in particular a roller, doctor blade or a flat or curved plate, these at least comprising a conductive sleeve and a covering layer which contains an intrinsically conductive polymer in a polymer film.

Owing to the presence of the specific covering layer, an article of this type is found to have good electric conductivity and high wear resistance. At the same time, the presence of the covering layer is found to have no adverse effect on the indentability of the sleeve, if required. As a result, the article has a long service life in a copier or printer and can be used to produce excellent copies or printouts. In addition, the covering layer proves able to withstand indentation of the article when in contact with rollers or other surfaces cooperating therewith.

The centre section of an indentable conductive roller is often, but not necessarily, made of metal. At least a sleeve section consists of a resilient, in particular indentable material, for example a natural or synthetic rubber, a thermoplastic polymer or thermoplastic vulcanizate or a microcellular rubber. Examples which are highly suitable for use in the article according to the invention include, for example, EPDM and SBR. This material is conductive, as a rule by having a conductive material dispersed therein. The conductive material used is commonly carbon black, but other materials known and customary for this purpose can likewise be used in the sleeve of the article according to the invention, if the sleeve consists of a material which has been made conductive, for example rubber. The electrical resistance of the sleeve which has been made conductive is between 100 and 10,000 Ω, as a rule, the resistance of a metal core which may or may not be present being negligibly small in comparison. Conductive articles, for example rollers, which do not come into contact with a cooperating roller or some other element can be made entirely of metal and then have a negligible electrical resistance. For magnetic developing rollers, non-ferrous metals, for example aluminium, are used as a rule or in any case non-magnetic materials, for example suitable types of stainless steel. Such rollers and their design and composition are known per se.

The resistance of the covering layer should be between $10^5$ and $10^7$ Ω when a voltage of between 100 and 900 V is applied and is preferably virtually constant in the said voltage range and more preferably varies by less than 1 decade, and even less than 0.5 decades, over the entire voltage range.

The thickness of the covering layer should be such that shorting is prevented. In practice, a thickness of 20 μm has proved sufficient for this purpose. Preferably, the thickness is greater than 50 μm and more preferably greater than 80 μm. In view of the possibly desirable resilient characteristics, a thickness less than 400 μm is desirable. Preferably, the thickness is less than 200 μm and more preferably less than 150 μm. The demands to be met regarding the resistance of the covering layer and the thickness thereof define the desired resistivity ρ in Ω.m of the covering layer material. The resistivity is determined by two electrodes having a surface area A being positioned on the material to be measured at a distance 1 from one another and by the resistance R being determined from the current measured when a voltage is applied.

The restivities are calculated as:

$$\rho = \Omega\ R.A/1[\Omega.m]$$

Suitable covering layer materials have a restivity of between $2\times10^5$ and $10^7$ Ω.m, or $2\times10^7$ and $10^9$ Ω.cm.

The invention will be explained with reference to the following examples.

EXAMPLES

What follows is based on a conductive roller having a length of 225 mm and a total diameter of 11.5 mm. The roller is composed of a steel core having a diameter of 6.0 mm, surrounded by a sleeve of a styrene-butadiene rubber having a hardness of 30 Shore A and 20 wt of a conductive black (DENKA BLACK from Denki KK) dispersed therein.

Example I

Four compositions for applying a conductive covering layer were fabricated as follows. An aqueous dispersion of a mixture of poly(ethylenedioxythiophene) and poly (styrenesulphonate) (Baytron P from Bayer, conductive-polymer content in the dispersion 1.3 wt %) was adjusted to a pH of 7.5, with the aid of 5 wt % ammonia, and then added to an aqueous dispersion of a polyurethane as a binder (Permutex EX-55-038 from Stahl Holland, polyurethane content in the dispersion 40 wt %) and is dispersed therein by stirring.

The weight ratios of the two dispersions and the conductive-polymer content in the composition were as shown in Table 1.

TABLE 1

| Permutex EX-55-038 grams | Baytron P grams | Baytron P content in wt % |
|---|---|---|
| 66.3 | 33.7 | 1.63% |
| 63.2 | 36.8 | 1.86% |
| 59.4 | 40.6 | 2.17% |
| 53.2 | 46.8 | 2.78% |

The composition was applied to the outer circumference of the roller, by means of dip-coating repeated a number of times, to achieve a total thickness of between 80 and 100 μm. Each separate layer was dried at room temperature. After the desired thickness had been reached, the roller was kept at 80° C. for 1 hour in order to harden the composition.

Each of the compositions was used to prepare three rollers. For each of the rollers, the resistance was determined at 800V, measured between one end of the metal core and a point on the sleeve circumference. In FIG. 1, the mean resistance of the rollers for each percentage of intrinsically conductive polymer is plotted against said percentage. The continuous line represents a least-squares fit of the experimental points. As can be seen, the resistance gradually changes with an increase in the percentage of intrinsically conductive polymer, so that a desired resistance can be set with good accuracy by adjusting the percentage of intrinsically conductive polymer in the composition.

Example II

Six compositions for applying a conductive covering layer were prepared by an aqueous dispersion of a polyurethane (Permutex RA-1035 from Stahl Holland, polyurethane content in the dispersion 40 wt %) being added to an aqueous dispersion of polypyrrole-coated polyurethane particles (Conquest XP-1000 from DSM Solutech, percentage of conductive polymer+substrate in the dispersion 20 wt %) and being dispersed therein by stirring. The weight ratios of the two dispersions in the composition and the conductive-polymer content in the composition were as shown in Table 2.

TABLE 2

| Permutex RA 1035 grams | ConQuest XP1000 grams | ConQuest XP1000 content in wt % |
|---|---|---|
| 70 | 30 | 17.6% |
| 70 | 30 | 17.6% |
| 65 | 35 | 21.2% |
| 60 | 40 | 25.0% |
| 50 | 50 | 33.3% |
| 40 | 60 | 42.9% |

The composition is applied, by means of dip-coating repeated a number of times, to the sleeve of the roller to produce a thickness of a 85–100 $\mu$m. In between, each separate layer was dried at room temperature. After the desired thickness had been reached, the roller was kept at 80° C. for 1 hour in order to harden the composition.

Figure 2:
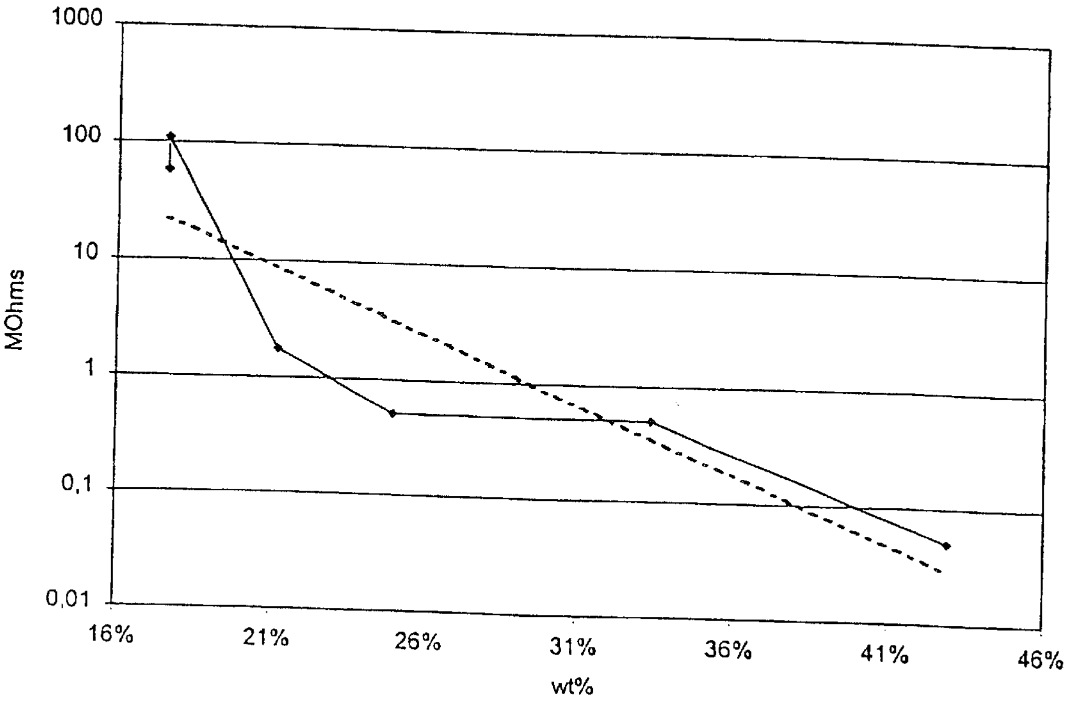

Each of the compositions was used to prepare three rollers. For each of the rollers, the resistance is determined at 800V, measured between one end of the metal core and a point on the sleeve circumference. In FIG. 2, the mean resistance of the rollers for each percentage of intrinsically conductive polymer is plotted against said percentage. The continuous line represents a least-squares fit of the experimental points.

As can be seen, the resistance changes relatively slowly with an increase in the percentage of intrinsically conductive polymer, so that a desired resistance can be set with good accuracy by adjusting the percentage of intrinsically conductive polymer in the composition.

Example III

In the manner described in Example I, six rollers were provided with a conductive covering layer. In so doing, the composition from Example I having a concentration of 2.17% was used for a first set of three rollers, and a corresponding composition was used for the second set of three rollers, except that the binder used is the urethane resin Impranil 85 UD from Bayer.

Figure 3:
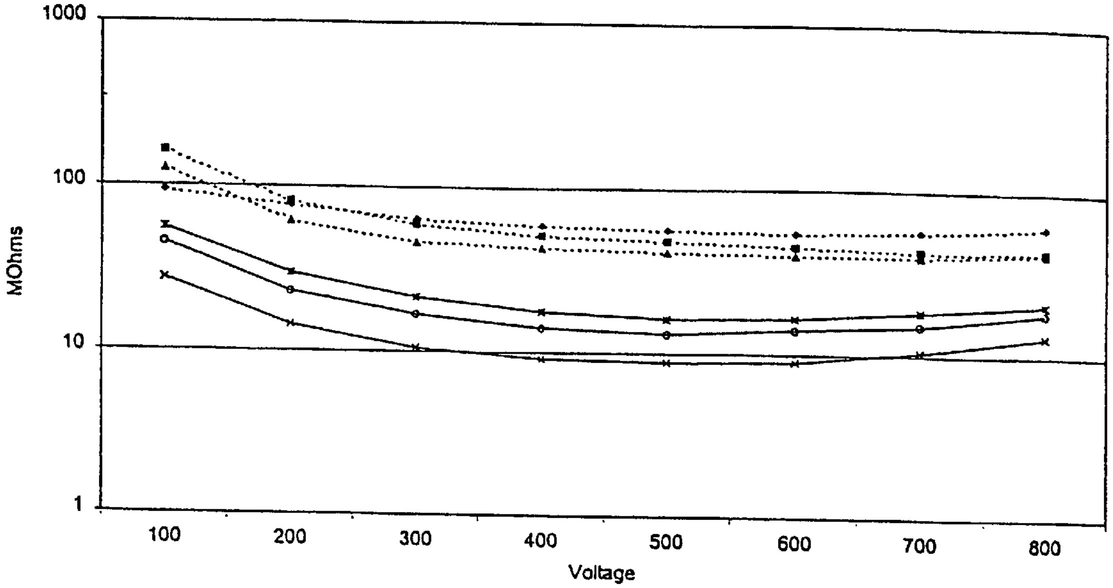

The resistance of each roller, measured between one end of the metal core and a point on the sleeve circumference of the roller, was measured as a function of the voltage applied. The results are shown in FIG. 3. The dotted lines represent results of the first set of three rollers, the continuous lines those of the second set of three.

It is found that the variation, as a function of the voltage applied, of the resistance is quite sufficiently low enough for the intended use of the rollers. The reproducibility is likewise amply sufficient for use of the rollers in electrophotographic and xerographic equipment.

Example IV

Figure 4:
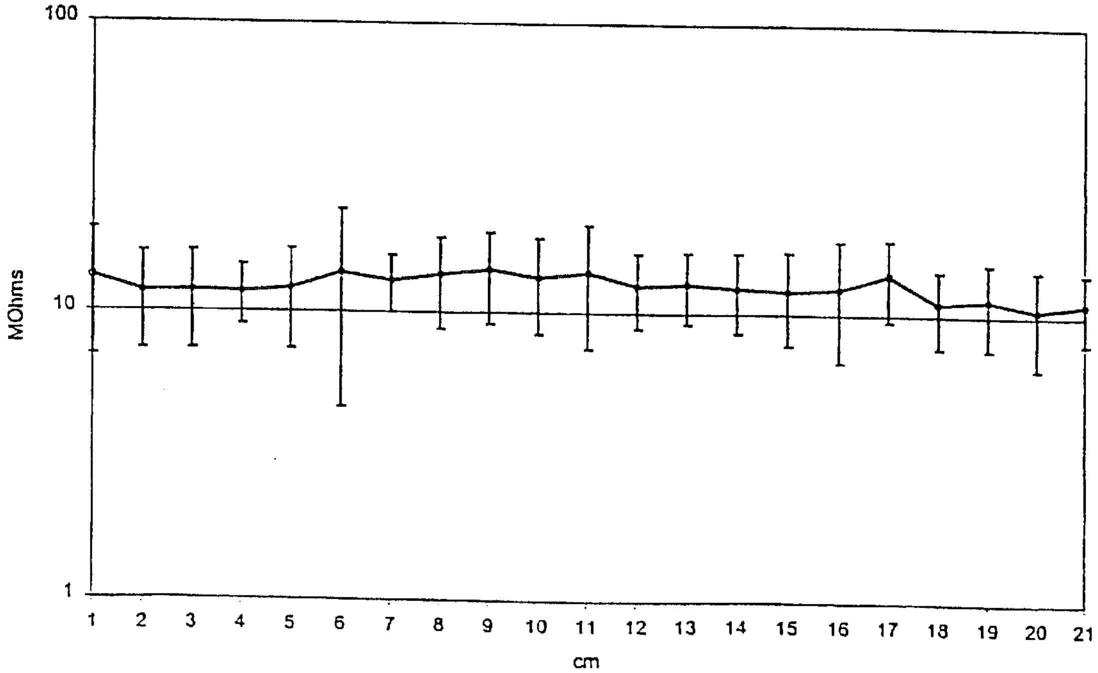

Eight rollers were produced by means of the method according to Example I, using a dispersion of Baytron P (Bayer) and Impranil 85 UD (Bayer) having a conductive-polymer content in the final covering layer of 2.17 wt %. The thickness of the covering layer was between 85 and 97 $\mu$m. With a voltage of 800 V being applied, the resistance was determined along the longitudinal direction of the rollers at distances of 1 cm each time. The mean values of the resistance and the standard deviation as a function of the position on the roller are shown in FIG. 4. The mean resistance is found to be virtually constant over the entire sleeve surface, and the scatter likewise remains well within the limits to be stipulated for use of the rollers in electrophotographic and xerographic equipment.

What is claimed is:

1. A conductive rubber article comprising a conductive rubber sleeve and a covering layer, said covering layer having a resistance in the range of from $10^5$ to $10^7$ Ω when a voltage of between 100 and 900 is applied and comprising an intrinsic conductive polymer which is solely responsible for the conductive properties of the layer, said intrinsic conductive polymer being at least one member selected from the group consisting of polyacetylene, polyphenylene, poly(para-phenylene-vinylene), polypyrrole, polyfuran, polythiophene, and polyaniline, wherein any of the foregoing may be present in conductive substituted forms, with the proviso that when the intrinsic conductive polymer is polypyrrole, polyacetylene or polythiophene, the polymer is present in conductive substituted form, and electrically inert film-forming polymer.

2. Conductive rubber article according to claim 1, wherein the resistance of the covering layer is substantially constant over said voltage range.

3. Conductive rubber article according to claim 1, wherein the electrically inert film-forming polymer is poly (vinylidene chloride), polymethacrylate, polyurethane, poly (vinyl acetate) or poly(vinyl alcohol).

4. Conductive rubber article according to claim 1, wherein the conductive rubber sleeve has a surface roughness in the range of from 3 to 10 $\mu$m.

5. Conductive rubber article according to claim 1, wherein the thickness of the covering layer is from 50 to 150 $\mu$m.

6. Conductive rubber article according to claim 1 in the form of a roller.

7. Conductive rubber article according to claim 1 in the form of a doctor blade.

8. Conductive rubber article according to claim 1, wherein the sleeve has an electric resistance in the range of from 100 to 10,000 Ω.

9. Method for fabricating a conductive article according to claim 1, at least comprising applying a covering layer to a conductive rubber sleeve, which comprises applying the covering layer to the conductive rubber sleeve while the rubber sleeve is not fully vulcanized and completing the vulcanization.

10. A charge transfer roller effective for electrostatically charging a photosensitive drum during electrographic or xerographic image formation, said charge transfer roller comprising a conductive rubber sleeve and a covering layer for the rubber sleeve, said covering layer comprising as the sole contributing component to the electrically conductive properties of the layer at least one intrinsic conductive polymer and an electrically inert film-forming polymer selected from the group consisting of poly(vinylidene chloride), polymethacrylate, polyurethane, poly(vinyl acetate) or poly(vinyl alcohol), said covering layer having a having a resistance in the range of from $10^5$ to $10^7$ Ω when a voltage of between 100 and 900 V is applied.

11. Charge transfer roller according to claim 10, wherein the resistance of the covering layer is substantially constant over said voltage range.

12. Charge transfer roller according to claim 10, wherein the conductive rubber sleeve has a surface roughness in the range of from 3 to 10 μm.

13. Charge transfer roller according to claim 10, wherein the thickness of the covering layer is from 50 to 150 μm.

14. Charge transfer roller according to claim 10, wherein the intrinsic conductive polymer is at least one of polyacetylene, polyphenylene, poly(para-phenylene-vinylene), polypyrrole, polyfuran, polythiophene, and polyaniline, wherein any of the foregoing may be present in conductive substituted form.

15. Charge transfer roller according to claim 14, wherein the intrinsic conductive polymer is at polypyrrole, polythiophene, conductive substituted form of polypyrrole, conductive substituted form of polythiophen or mixture of two or more of the foregoing.

16. Charge transfer roller according to claim 14, wherein the electrically inert film-forming polymer is a polyurethane.

17. Charge transfer roller according to claim 10, wherein the sleeve has an electric resistance in the range of from 100 to 10,000 Ω.

* * * * *